US006807915B2

(12) United States Patent
Sugano et al.

(10) Patent No.: US 6,807,915 B2
(45) Date of Patent: Oct. 26, 2004

(54) METHOD OF CARBONIZATION OF ORGANIC WASTE AND APPARATUS THEREFOR

(75) Inventors: Masahiro Sugano, Osaka (JP); Yoshihiro Nagashima, Osaka (JP); Masashi Ibata, Osaka (JP); Masaaki Ohyama, Osaka (JP)

(73) Assignee: Nippon Zoki Pharmaceutical Co., Ltd., Osaka (JP)

( * ) Notice: Subject to any disclaimer, the term of this patent is extended or adjusted under 35 U.S.C. 154(b) by 125 days.

(21) Appl. No.: 10/246,699

(22) Filed: Sep. 19, 2002

(65) Prior Publication Data

US 2003/0051647 A1 Mar. 20, 2003

(30) Foreign Application Priority Data

Sep. 20, 2001 (KR) ................................. 10-2001-58328

(51) Int. Cl.[7] .............................. F23B 7/00; F23G 5/12; F23G 5/04; F23L 7/00
(52) U.S. Cl. .................. 110/233; 110/224; 110/204; 110/205; 110/297; 110/306; 110/348; 110/229
(58) Field of Search ................................. 110/224, 204, 110/205, 297, 306, 348, 346, 229, 233

(56) References Cited

U.S. PATENT DOCUMENTS

| 4,245,570 | A | * | 1/1981 | Williams | 110/238 |
| 4,821,653 | A | * | 4/1989 | Jones | 110/229 |
| 5,101,740 | A | * | 4/1992 | Abril | 110/230 |
| 5,279,234 | A | * | 1/1994 | Bender et al. | 110/210 |
| 5,411,714 | A | * | 5/1995 | Wu et al. | 422/232 |
| 5,720,232 | A | * | 2/1998 | Meador | 110/346 |
| 6,105,275 | A | * | 8/2000 | Aulbaugh et al. | 34/424 |

* cited by examiner

Primary Examiner—Kenneth B Rinehart
(74) Attorney, Agent, or Firm—Ronald E. Greigg

(57) ABSTRACT

The method of carbonization of organic waste according to the present invention comprises the steps of supplying organic waste to a dryer, reducing an amount of water in the organic waste by heating with high-temperature gas, supplying the organic waste to a carbonization furnace for carbonizing the organic waste in a high-temperature ambience, removing carbide from the carbonization furnace, incinerating gas, which is generated in the carbonization furnace, in a re-incinerating furnace, and supplying combustion gas of the re-incinerating furnace to the dryer as the high-temperature gas.

4 Claims, 4 Drawing Sheets

METHOD OF CARBONIZATION OF ORGANIC WASTE AND APPARATUS THEREFOR

BACKGROUND OF THE INVENTION

1) Field of the Invention

The present invention relates to a method of carbonization of organic waste such as sludge in rivers and seas, sludge of excrement, sludge of wastewater and residues of food, and an apparatus used therefor.

(2) Prior Art

Conventionally, organic waste such as sludge in rivers and seas, sludge of excrement, sludge of wastewater and residues of food generally has been incinerated in many cases. In these cases, such an environmental problem has occurred that dioxins have been generated in the process of incineration, and an environmental problem of energy consumption have occurred as the organic waste has contained much water wherefore much fuel has been required for incineration.

Therefore, with the enforcement of the recycling law, carbonization of the organic waste by using a carbonization furnace has been tried these years.

However, even in the carbonization of the organic waste by using the carbonization furnace, there has been a problem that the carbonization still has required much fuel, as the organic waste in a state of containing much water therein has been processed in the carbonization furnace.

Further, in the carbonization furnace, fuel has been burnt in order to raise temperature in the furnace, however, as the organic incinerator has contained much water therein, it has been necessary to burn much fuel. Accordingly, supply of much oxygen into the incinerator has required, wherefore there has been such problems that the organic waste has been incinerated to ashes but not carbonized, and dioxins have been generated.

SUMMARY OF THE INVENTION

The present invention presents a method of carbonization of organic waste and an apparatus therefor, in which gas being generated by carbonization of the organic waste in a carbonization furnace is burnt, and burning gas thereof is utilized to reduce water of the organic waste in a dryer, whereby the organic waste with less water therein can be surely carbonized with low energy.

The method of carbonization of organic waste of claim 1, comprises the steps of supplying organic waste to a dryer, reducing an amount of water in the organic waste by heating with high-temperature gas, supplying the organic waste to a carbonization furnace for carbonizing the organic waste in a high-temperature ambience, removing carbide from the carbonization furnace, incinerating gas, which is generated in the carbonization furnace, in a re-incinerating furnace, and supplying combustion gas of the re-incinerating furnace to the dryer as the high-temperature gas.

The apparatus for carbonization of organic waste of claim 2, comprises a dryer for receiving organic waste and reducing an amount of water contained in the organic waste by heating with high-temperature gas, a carbonization furnace for carbonizing the organic waste in a high-temperature ambience, the amount of water of the organic waste being reduced by means of the dryer, a re-incinerating furnace for incinerating gas which is generated in the carbonization furnace, a transmitting passage for transmitting combustion gas, which is generated in the re-incinerating furnace, to the dryer as the high-temperature gas, and a supply passage for supplying the organic waste to the carbonization furnace; the said organic waste being treated to reduce the amount of water by means of the dryer.

Further, in the apparatus for carbonization of organic waste of claim 3, as claimed in claim 2, it further comprises a flow passage provided with the dryer for the high-temperature gas generated in the re-incinerating furnace, wherein the dryer is heated with the high-temperature gas which flows in the flow passage of high-temperature gas and wherein the gas in the flow passage of high-temperature gas, which is used for heating, is exhausted.

Furthermore, in the apparatus for carbonization of organic waste of claim 4 and claim 5, as claimed in claim 2 or claim 3, a flow passage is provided with the dryer for the high-temperature gas generated in the dryer, wherein the dryer is heated with the high-temperature gas which flows in the flow passage of high-temperature gas and wherein the gas in the flow passage of high-temperature gas, which is used for heating, is exhausted.

In addition, in the apparatus for carbonization of organic waste of claim 6 and claim 7, as claimed in claim 4 or claim 5, the screw conveyer of the dryer and the re-incinerating furnace are connected to and communicated with each other by means of an air-supply passage to transmit evaporated gas, which is generated according to the reducing treatment of the amount of water in the organic waste.

Finally, in the apparatus for carbonization of organic waste of claim 8 and claim 9, as claimed in claim 6 or claim 7, a dust collector is interposed in the air-supply passage.

According to the method of carbonization of organic waste of the present invention, since water of the organic waste containing much water therein is reduced in a dryer in advance and then carbonization of the organic waste is carried out in a carbonization furnace, an amount of fuel to be burnt for raising a temperature in the incinerator can be cut down whereby lower energy consumption can be attained. In addition, an amount of oxygen supplied to the incinerator is held down to secure a state of oxygen deficiency, whereby carbonization of the organic waste surely can be attained.

Furthermore, the organic waste is dried in such a manner that gas generated by carbonization of the organic waste is burnt in a re-incinerating furnace and the combustion gas, being high-temperature gas, is supplied to the dryer, by which high-temperature gas the water in the organic waste is reduced. Therefore, it is not necessary to separately prepare fuel for the dryer, and energy saving can be achieved by recycling of energy.

ADVANTAGES OF THE INVENTION

In the method of carbonization of organic waste and the apparatus for carbonization of the organic waste used therefor according to the present invention, since the organic waste is supplied to the carbonization furnace after an amount of water contained therein is reduced in the dryer, an inside of the carbonization furnace can be heated to a high-temperature ambience with a small amount of fuel, wherefore energy saving can be attained. Further, since the amount of fuel for heating the inside of the carbonization furnace is reduced, an amount of the air supplied into the carbonization for burning the fuel can be lessened and the inside of the carbonization furnace can maintain a good state of oxygen deficiency, wherefore the organic waste can be surely carbonized without unexpectedly being incinerated to ashes.

In addition, the gas generated in the carbonization furnace is burnt in a re-incinerating furnace and the combustion gas is supplied to a dryer as high-temperature gas. The amount of water in the organic waste is reduced in the dryer by utilizing the high-temperature gas, wherefore it is not necessary to prepare fuel for heating the dryer separately, which means excellency in energy saving. Further, gas generated in a process of carbonization of the organic waste in the carbonization furnace is deodorized and made to be non-poisonous by being burnt and decomposed, which also means excellency in terms of environment.

Moreover, in the apparatus for carbonization of the organic waste, the dryer provides a flow passage of high-temperature gas. The dryer is heated with the high-temperature gas flowing in the flow passage of high-temperature gas. In case it is so constructed that the gas in the high-temperature gas used for heating is exhausted, the dryer is heated by having the high-temperature gas generated in the re-incinerating furnace flowed in the flow passage of the high-temperature gas. By heating the dryer in the manners as mentioned above, the amount of the organic waste in the dryer is reduced, whereby energy saving can be attained, and the high-temperature gas is exhausted outside after the temperature of the high-temperature is lowered by giving the quantity of heat contained in the high-temperature gas to the organic waste in the dryer, which means excellency in terms of environment.

Further, in the apparatus for carbonization of the organic waste, the dryer comprises a screw conveyer $1a$, which receives the organic waste, and a flow passage of high-temperature gas $1b$, which encloses the screw conveyer $1a$. In case a transmitting passage is connected to and communicated with a side of an inlet of the flow passage of high-temperature gas and an exhaust gas path is connected to and communicated with a side of an outlet of the flow passage of high-temperature gas, the flow passage of high-temperature gas is completely isolated from the inside of the screw conveyer, wherefore evaporated gas generated in a process of reducing treatment of water in the organic waste in the screw conveyer and the high-temperature gas flowing in the flow passage of high-temperature gas are not mixed with each other, whereby the high-temperature gas, after being used in the dryer, is exhausted outside while maintaining a clean state of being deodorized and becoming nonpoisonous in the re-incinerating furnace, which means excellency in terms of environment.

In addition, in the apparatus for carbonization of the organic waste, in case the screw conveyer of the dryer and the re-incinerating furnace are connected to and communicated with each other via an air-supply passage whereby the evaporated gas generated in a process of reducing treatment of water in the organic waste is transmitted to the re-incinerating furnace, the evaporated gas is burnt in the re-incinerating furnace and the combustion gas is recycled as high-temperature gas for heating the dryer, and energy saving can be attained.

Furthermore, as smelling gas and poisonous gas contained in the evaporated gas are burned and decomposed in the re-incinerating furnace, and are deodorized and made to be nonpoisonous, the gas exhausted outside is clean and is excellent in terms of environment.

Lastly, as the apparatus for carbonization of the organic waste comprises a dust collector interposed in the air-supply passage, the evaporated gas is supplied to the re-incinerating furnace after ultra-fine particles contained therein are removed, whereby the evaporated gas can be burnt well in the re-incinerating furnace and breakage of the re-incinerating furnace caused by burning of the ultra-fine particles can be prevented.

BRIEF DESCRIPTION OF THE DRAWINGS

The drawings show embodiments of a method of carbonization of organic waste and an apparatus for carbonization of organic waste in which.

DETAILED DESCRIPTION OF THE PREFERRED EMBODIMENTS

Figure 1:
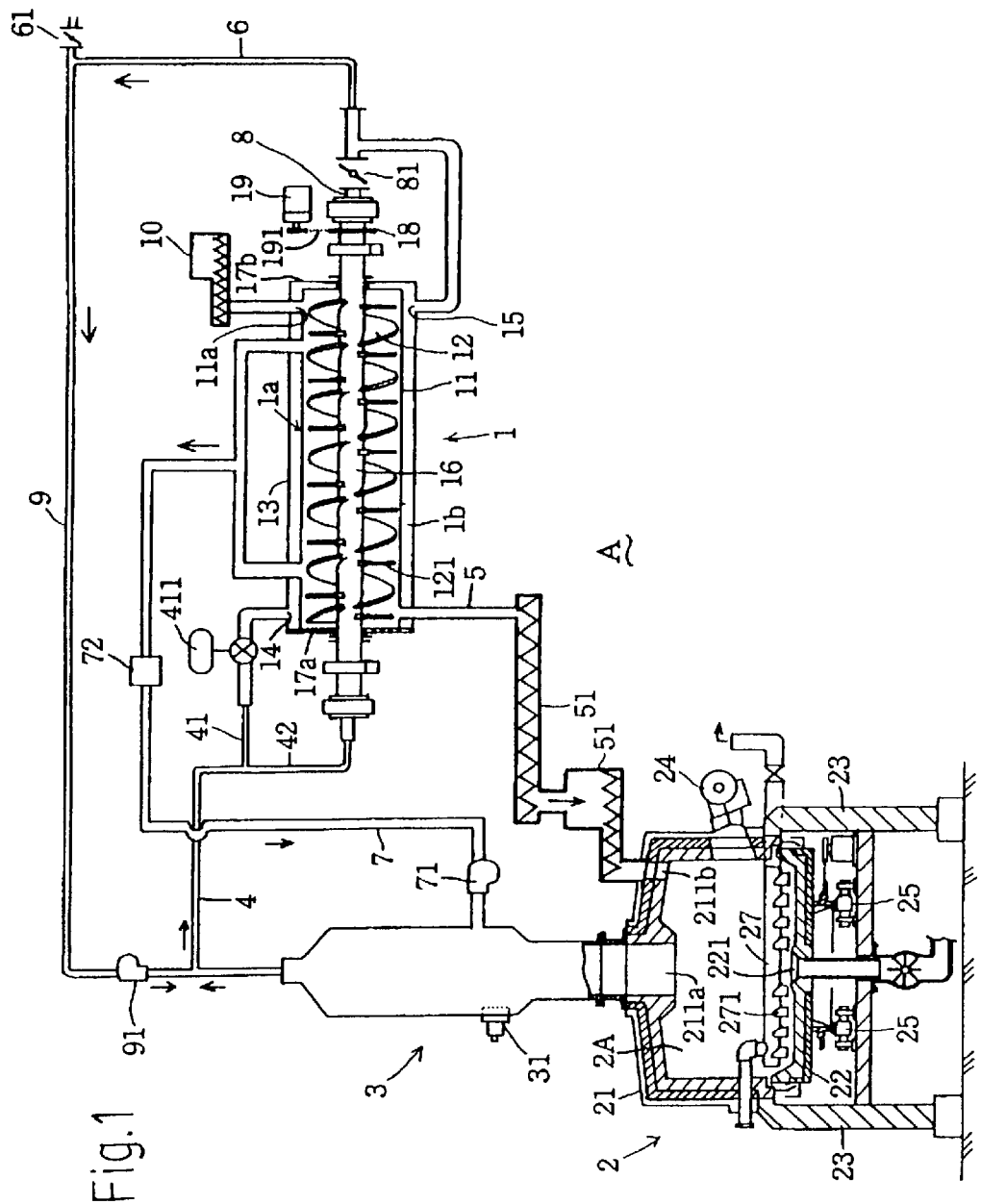
FIG. 1 is a partially sectional view of an apparatus for carbonization of organic waste according to the present invention.

An embodiment of an apparatus used for carbonization of organic waste according to the present invention will be explained hereinafter referring to drawings. As shown in FIG. 1, an apparatus for carbonization (A) of the organic waste comprises a dryer 1 for receiving organic waste and reducing an amount of water contained in the organic waste by heating with high-temperature gas, a carbonization furnace 2 for carbonizing the organic waste in a high-temperature ambience, the amount of water of the organic waste being reduced by means of the dryer 1, a re-incinerating furnace 3 for incinerating gas which is generated in the carbonization furnace 2, a transmitting passage 4 for transmitting the combustion gas, which is generated in the re-incinerating furnace 3, to the dryer 1 as the high-temperature gas, and a supply passage 5 for supplying the organic waste to the carbonization furnace 2; the said organic waste being treated to reduce the amount of water by means of the dryer 1.

The dryer 1 comprises a screw conveyer $1a$, which has a function of agitating the organic waste, and a flow passage of high-temperature gas $1b$, which encloses the screw conveyer $1a$. To be detail, the screw conveyer $1a$ comprises a cylindrical body 11 and screw blades 12, which are deposited in the cylindrical body 11 so that they can rotate freely. A large-diametral outer cylindrical body 13, whose diameter is larger than that of the cylindrical body 11, is mounted to be integrated with the cylindrical body 11 so as to enclose the cylindrical body 11 of the screw conveyer $1a$. A gap between the large diametral outer cylindrical body 13 and the cylindrical body 11, which gap has a ring-shaped section, is formed to be the flow passage of high-temperature gas $1b$. The flow passage of high-temperature gas $1b$ and an inside of the screw conveyer $1a$ are completely isolated from each other. In the meantime, both ends of the flow passage of high-temperature gas $1b$ are closed, and an inlet 14 is formed at one end and an outlet 15 is formed at the other end.

Further, the screw blades 12 of the screw conveyer $1a$ are fixed onto and integrated with an outer periphery of a hollow shaft 16. Both ends of the hollow shaft 16 are supported rotatably and airtightly by center parts of closure plates $17a$, $17b$ respectively, which closure plates $17a$, $17b$ close both ends of the screw conveyer $1a$. Further, a branch passage 42 of a transmitting passage 4, which will be described hereinafter, is connected to and communicated with a projecting end of the hollow shaft 16 which projects from the closure plate 17a, and an exhaust passage 8, which will be described hereinafter, is connected to and communicated with the other projecting end of the hollow shaft 16 projecting from the other closure plate 17b. Furthermore, a sprocket 18 is fixed to the latter-mentioned projecting end. A chain 191 is stretched between the sprocket 18 and a sprocket, which is fixed to a rotary shaft of a drive motor 19, so that the screw blades 12 can be rotated by means of the drive motor 19. In the meantime, a rod 121 of a predetermined length is mounted to promote agitation of the organic waste between adjacent screw blades 12, 12 so as to project from the outer periphery of the hollow shaft 16.

Moreover, on an upper surface of a beginning part of conveying of the cylindrical body 11 of the screw conveyer 1a, a supply port 11a, through which the organic waste to be carbonized is supplied, is arranged. A screw conveyer 10, which continuously supply the organic waste into the screw conveyer 1a, is connected airtight to an outside opening part of the supply port 11a.

Figure 2:
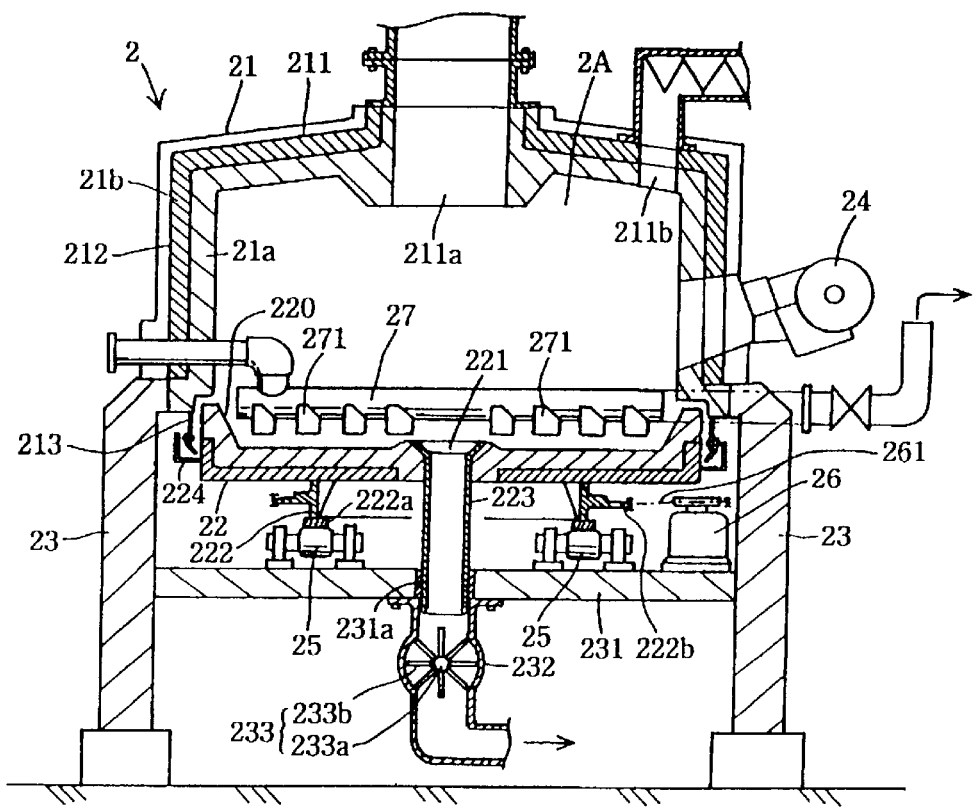
FIG. 2 is a vertical sectional view of a carbonization furnace according to the present invention.

In the meantime, as shown in FIG. 2, the above-mentioned carbonization furnace 2 comprises a furnace wall 21, which is hollow and a lower end thereof is open, and a hearth 22, which shuts the lower opening end of the furnace wall 21 airtight, is rotatable.

To be specific, the furnace wall 21 comprises a flat and circular-shaped ceiling 211 and a ring-shaped surrounding wall 212, which is mounted to project downwardly from the peripheral part of the ceiling 211 and has a predetermined height. The furnace wall 21 is set at a predetermined height by a plurality of legs 23, which are mounted to the lower end of the surrounding wall 212 and have the same height with one another. In the meantime, the furnace wall 21 comprises a refractory wall part 21a and an outer wall part 21b, which is made of steel board and covers the outer surface of the refractory wall part 21a all over.

In addition, a burner 24 is provided to be integrated with the lower end of the surrounding wall 212 of the furnace wall 21, with which burner 24 the temperature in the furnace is raised to obtain a high-temperature ambience.

Further, an exhaust port 211a is provided with a center part of the ceiling 211 of the furnace wall 21 to penetrate the inside and outside surfaces thereof for transmitting gas, which is generated in a process of carbonization of the organic waste, into the re-incinerating furnace 3, and an outside opening part of the exhaust port 211a is connected to and communicated with an lower opening part of the re-incinerating furnace 3.

Furthermore, an input port 211b is provided with a peripheral part of the ceiling 211 of the furnace wall 21 to penetrate the inside and outside surfaces thereof, through which the organic waste, whose water is reduced in the dryer 1, is put into the carbonization furnace 2. The input port 211b is so constructed that the organic waste being put through the input port 211b can drop on and be located on the upper surface of a peripheral part of the hearth 22.

In the meantime, the input port 211b may also be provided with the surrounding wall 212 of the furnace wall 21 to penetrate the inside and outside surfaces thereof as far as the organic waste being put into the carbonization furnace 2 through the input port 211b drops on and is located on the upper surface of a peripheral part of the hearth 22.

As shown in FIG. 2, the above-mentioned hearth 22 is made of a refractory body in a state of plate, whose ground plan is circular shaped, whose diameter is almost the same with that of the lower opening part of the furnace wall 21 and whose predetermined thickness is constant. Further, the hearth 22 is supported and arranged rotatably above the supporting plate 231, which is supported horizontally by the legs 23 to be located at a height being a middle point of the height of the legs 23 via supporting rollers 25.

To be specific, the above-mentioned hearth 22 is made of a refractory material and is formed to be a disc shape whose predetermined thickness is almost constant and whose upper surface is flat. A ring-shaped low wall 220 with a constant height is mounted to project upwardly from a whole peripheral part of an upper surface of the hearth 22, and a carbide exhaust opening part 221 is provided with a center of the hearth 22 to penetrate the upper and lower surfaces thereof.

Further, a carbide exhaust pipe 223, whose length is predetermined and an outer diameter thereof is fit to an inner diameter of the carbide exhaust opening part 221, is inserted into the carbide exhaust opening part 221 from upside, and an upper end of the carbide exhaust pipe 223 is brought into close and tight contact with the carbide exhaust opening part 221 so as to obtain a state of airtight. Furthermore, the carbide exhaust pipe 223 is projected downwardly through a lower opening end of the carbide exhaust opening part 221, and a lower end of the carbide exhaust pipe 223 is inserted into a supporting opening part 231a, which is provided with a center part of the supporting plate 231 to penetrate the upper and lower surfaces thereof, so as to be rotatable and to be in an airtight state.

Moreover, an upper end of a carbide output pipe 232 is connected to and communicated with the lower opening end of the supporting opening part 231a of the supporting plate 231 to be in an airtight state. A rotor 233, comprising a shaft 233a and blades 233b provided to project radially from the shaft 233a, is arranged in a center of the carbide output pipe 232. The rotor 233 is constructed so as to be rotatable in an up-and-down direction with surfaces of tips of the blades 233b keeping in tough with and rubbing inner surface of the carbide output pipe 232.

Accordingly, the carbide output pipe 232 shuts out the outside air by the rotor 233 at an upper part of the carbide output pipe 232, and has such a construction that the outside air is difficult to come into above the hearth 22 of the carbonization furnace 2 through a lower opening part of the carbide output pipe 232.

Further, a ring-shaped supporting pedestal 222 with a constant height is mounted to project downwardly from a lower surface of the hearth 22 with a center of the former fitting to a center of the latter. A ring-shaped receiving member 222a, is mounted to be integrated with and around a lower end surface of the supporting pedestal 222.

In the meantime, a plurality of the supporting rollers 25 are arranged on a circumference of an hypothetical circle at portions of the upper surface of the supporting plate 231, which portions face the ring-shaped receiving member 222a.

Further, a sprocket 222b, is mounted to be integrated with an outer surface of the supporting pedestal 222, and a drive motor 26 is arranged on the supporting plate 231. A chain 261 is stretched between the sprocket 222b of the supporting pedestal 222 and the drive motor 26.

When the drive motor 26 is driven, power of the drive motor 26 is transmitted to the sprocket 222b via the chain 261, and it is so constructed that the supporting pedestal 222 which is integrated with the sprocket 222b, namely the hearth 22, can rotate around the carbide exhaust pipe 223 freely and horizontally.

Now, a construction of connection between the furnace wall 21 and the hearth 22 is explained hereinafter. The furnace wall 21 and the hearth 22 are connected by means of labyrinth seal. To be specific, a connection-receiving member 224, whose section is an L-letter shape, is mounted around and to project from an outer peripheral surface of the hearth 22, and a heat-resistant packing member 213 is mounted around and to project downwardly from the lower surface of the furnace wall 21. By inserting the packing member 213 into the connection-receiving member 224 in a manner that a tip of the packing member 213 comes close to but does not touch the outer peripheral surface of the hearth 22, the furnace wall 21 and the hearth 22 are connected by means of labyrinth seal, whereby furnace inside 2A formed by inner surfaces of the furnace wall 21 and the hearth 22 is isolated from the outside air to be in an airtight state.

Figure 4:
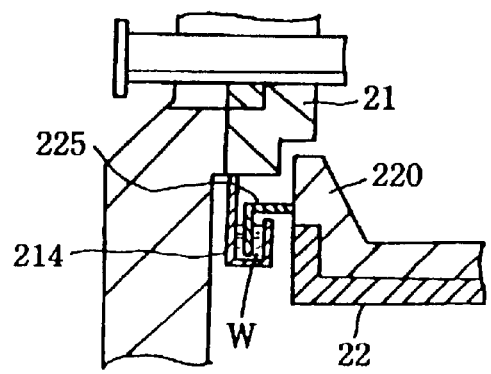
FIG. 4 is a sectional view showing another example of a structure of connection between the furnace wall of and the hearth of a carbonization furnace.

In the meantime, the furnace wall 21 and the hearth 22 may be constructed to connect with each other as mentioned below without connecting by means of the above-mentioned labyrinth seal. Namely, as shown in FIG. 4, a ring-shaped connection receiver 214 is mounted to project downwardly from whole periphery of a lower end surface of the furnace wall 21, and a lower end portion of the connection receiver 214 is bent inwardly and then upwardly in a letter- of Japanese Katakana. In the meantime, a connection-inserting member 225 is mounted to project from whole outer peripheral surface of the ring-shaped low wall 220 of the hearth 22 and a tip portion of the connection-inserting member 225 is bent downwardly so that a section thereof can be a L-letter shape. Then the downward tip portion of the connection-inserting member 225 is inserted into but not in touch with the connection receiver 214, and a- letter tip portion of Japanese Katakana is filled with water (W) so that the tip portion of the connection-inserting member 225 can soak therein, whereby the furnace inside 2A formed by the inner surfaces of the furnace wall 21 and the hearth 22 is isolated from the outside air to be in an airtight state.

Figure 3:
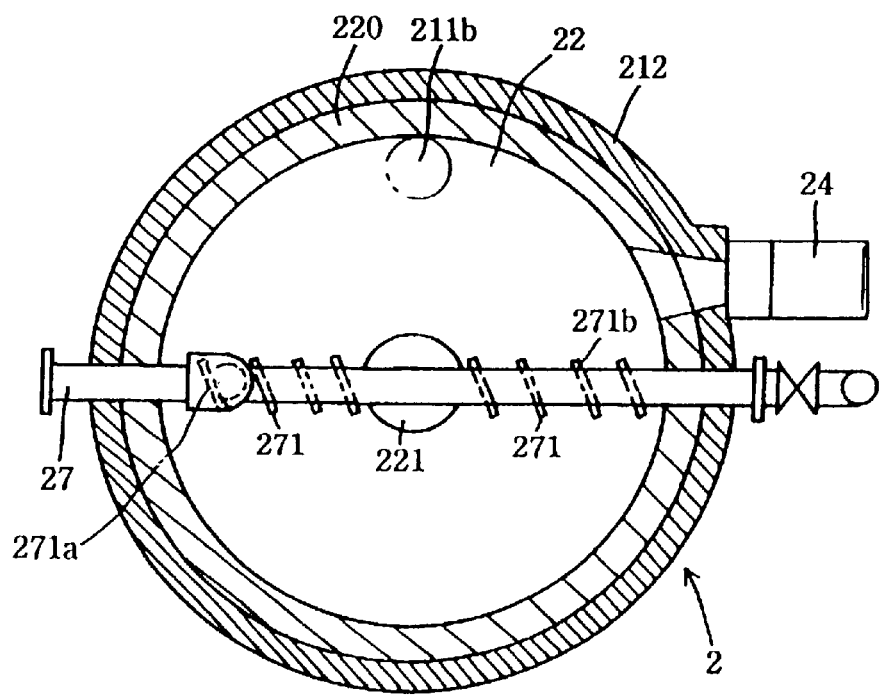
FIG. 3 is a plan view showing the hearth of the carbonization furnace according to the present invention.

Further, as shown in FIGS. 2 and 3, a cooling pipe 27 of a predetermined length is provided above and near the hearth 22, being the furnace inside 2A, in a horizontal direction and in a manner that a longitudinal direction thereof corresponds to a direction of a diameter of the hearth 22. Further, both ends of the cooling pipe 27, project outwardly at lower end portions of the surrounding wall 212 of the furnace wall 21 in an airtight state to go through in an inside-outside direction. By sending the outside air from one end of the cooling pipe 27 and having the same exhausted through the other end by a fan (not indicated in a Fig.), the cooling pipe 27 and controlling plates 271, which project from the cooling pipe 27 and will be mentioned hereinafter, are cooled down all the time so as not to be deformed at the temperature of the furnace inside 2A.

Furthermore, a plurality of controlling plates 271 are mounted to project downwardly from the lower outer peripheral surface of the cooling pipe 27, except the part of the lower peripheral surface which faces the carbide exhaust opening part 221 of the hearth 22. The controlling plates 271 are arranged in a state that they are inclined by a predetermined angle to a plan which is at right angle with respect to an axis of the cooling pipe, in other words, the controlling plates 271 are arranged in a state that they have a direction inclined inwardly of the direction of progress of the organic waste on the hearth 22 which is moved by rotation of the hearth 22.

In a state as described hereinbefore, the organic waste, which is put through the input port 211b of the furnace wall 21, drops on and is received by the upper surface of a peripheral part of the hearth 22, and moves counterclockwise around a center of the hearth 22 in a state of being laid on the hearth 22 along with the hearth 22 which rotates counterclockwise, for example, in FIG. 3. Then when and where the hearth 22 rotates by a predetermined angle, the organic waste laid on the hearth 22 impinges upon a controlling plate 271a of the cooling pipe 27 located on a circumference track.

Further, the organic waste is made to move forward along the rotation of the hearth 22 on which the organic waste is laid. However, since the organic waste is controlled by the controlling plate 271a, the organic waste moves forward while moving along a impinged surface of the controlling plate 271a, namely, moving on the hearth 22 in a direction of progress of the organic waste (a direction to the center of the hearth 22).

When and where the organic waste moves to the inner side of an inner end of the controlling plate 271a (in a direction of the center of the hearth 22), the organic waste is released from control by the controlling plate 271a, and moves counterclockwise along a hypothetical circumference around the center of the hearth 22 with the rotation of the hearth 22 in a state of being laid on the hearth 22.

Furthermore, when and where the organic waste moves counterclockwise by 180-, the organic waste impinges upon an controlling plate 271b again. Then the organic waste further moves forward while being moved by the controlling plate 271b on the hearth 22 in a direction of inward of the circumference track of the organic waste (in a direction to the center of the hearth 22). When and where the organic waste moves to the inner side of an inner end of the controlling plate 271b (in a direction of the center of the hearth 22), the organic waste again moves counterclockwise along a hypothetical circumference around the center of the hearth 22 with the rotation of the hearth 22 in a state of being laid on the hearth 22.

The organic waste is gradually carbonized on the hearth 22 while repeating the above-mentioned process, and comes closer to the center part of the hearth 22 while being displaced in a spiral shape. Then at last, after being completely carbonized, the organic waste reaches the carbide exhaust opening part 221, drops into the carbide exhaust opening part 221, goes through the carbide exhaust pipe 223, makes the rotor 233 in the carbide output pipe 232 rotate, and is exhausted through the lower end opening part of the carbide output pipe 232.

Further, the upper end opening part of the exhaust port 211a of the furnace wall 21 of the carbonization furnace 2 is connected to and communicated with the re-incinerating furnace 3 in a state of airtight, as mentioned above, whereby the furnace inside 2A of the carbonization furnace 2 and the inside of the re-incinerating furnace 3 are communicated with each other. In addition, a burner 31, for burning the gas generated in the furnace inside 2A of the carbonization furnace 2 and the gas transmitted from the dryer 1, is mounted to and is integrated with a lower end part (a position close to the carbonization furnace) of the re-incinerating furnace 3.

Next, a state of connection between the dryer 1 and the carbonization furnace 2 will be explained hereinafter. The dryer 1 and the carbonization furnace 2 are connected to and communicated with each other via a supply passage 5. To be specific, an upper end of the supply passage 5 is connected and communicated with an ending part of conveying of the screw conveyer 1a of the dryer 1, and a lower end of the supply passage 5 is connected to and communicated with an outside opening part of the input port 211b of the furnace wall 21 of the carbonization furnace 2 via a screw conveyer 51, whereby the inside of the screw conveyer 1a of the dryer 1 and the furnace inside 2A of the carbonization furnace 2 are connected to and communicated with each other. To be detail, the lower end of the supply passage 5 is communicated with beginning parts of conveying of one or more than two screw conveyers 51, and an ending part of conveying of the screw conveyers 51 is communicated with the furnace inside 2A, so that the organic waste taken from the screw conveyer 1a of the dryer 1 can be supplied smoothly to the furnace inside 2A of the carbonization furnace 2 via the supply passage 5.

Further, a state of connection between the dryer 1 and the re-incinerating furnace 3 will be explained hereinafter. The inside of the screw conveyer 1a of the dryer 1 and the inside of the re-incinerating furnace 3 are connected to and communicated with each other via an air-supply passage 7 comprising a duct line. To be specific, the inside of the screw conveyer 1a of the dryer 1 and the inside of the re-incinerating furnace 3 are connected to and communicated with each other by branching one end of the air-supply passage 7 into two and connecting and communicating each of the two to and with front and rear portions of the inside of the screw conveyer 1a of the dryer 1 respectively, and by connecting and communicating the other end of the air-supply passage 7 to and with the re-incinerating furnace 3 so as to face the burner 31 mounted to the re-incinerating furnace 3.

Furthermore, a fan 71 is interposed in the air supply passage 7 for absorbing evaporated gas generated in the screw conveyer 1a of the dryer 1 and compulsorily transmitting the same into the re-incinerating furnace 3. In addition, a dust collector 72 is interposed in the air supply passage 7 for removing ultra-fine particles contained in the evaporated gas generated in the screw conveyer 1a of the dryer 1.

Moreover, an upper end of the re-incinerating furnace 3 and the dryer 1 is connected to and communicated with each other via the transmitting passage 4 comprising a duct line. To be specific, the transmitting passage 4, which is communicated with the upper end of the re-incinerating furnace 3, is branched into two at a halfway part thereof. One of the two, being a branch passage 41, is connected to and communicated with an inside of the flow passage of high-temperature gas 1b, and the other of the two, being a branch passage 42, is connected to and communicated with one end of the hollow shaft 16 of the screw conveyer 1a of the dryer 1.

In addition, a control unit 411 is interposed in the branch passage 41, which control unit 411 detects the temperature of the high-temperature gas transmitted from the re-incinerating furnace 3, controls the number of rotation of the screw blades 12 of the screw conveyer 12 of the dryer 1 according to the temperature of the high-temperature gas, regulates detention time of the organic waste in the screw conveyer 1a of the dryer 1, and makes the reduction of water contained in the organic waste the best in the dryer 1.

Furthermore, one end of an exhaust gas path 6 comprising a duct line is connected to and communicated with an outlet 15 of the flow passage of high-temperature gas 1b of the dryer 1, and the high-temperature gas after finishing heating the dryer 1 is exhausted as exhaust gas through the other end of opening part of the exhaust gas path 6. Moreover, an automatic control damper 61 is interposed in this end of opening part of the exhaust gas path 6 for automatically controlling the amount of the exhaust gas.

One end of the exhaust passage 8 comprising a duct line is connected to and communicated with the other end of the hollow shaft 16 of the screw conveyer 1a of the dryer 1, and the other end of the exhaust passage 8 is connected to and communicated with one end of the exhaust gas path 6. An automatic control damper 81 is interposed in the exhaust passage 8 for automatically controlling the amount of flow of the high-temperature gas flowing in the exhaust passage 8.

Further, one end of a regulation passage 9 comprising a duct line is connected to and communicated with the transmitting passage 4 at a position which is closer to the re-incinerating furnace 3 than a branch portion of the transmitting passage 4, and the other end of the regulation passage 9 is connected to and communicated with the exhaust gas path 6 at a position between the connection with the exhaust passage 8 and the damper 61 so that part of the high-temperature gas in the exhaust gas path 6 can be supplied to the transmitting passage 4 as a regulation gas through the regulation passage 9.

In addition, a fan 91 is interposed in the regulation passage 9 for absorbing the regulation gas flowing in the regulation passage 9 from the side of the exhaust gas path 6 toward the transmitting passage 4. By regulating a degree of absorption of the fan 91 of the regulation passage 9 and a degree of opening and closing of the damper 61 of the exhaust gas path 6, the amount of the regulation gas flowing from the exhaust gas path 6 into the regulation passage 9 is regulated.

Next, a method of carbonization of the organic waste such as sludge in rivers and seas, sludge of excrement, sludge of waste water and residues of food by using the above-mentioned apparatus for carbonization (A) for the organic waste. At first, the organic waste, which is to be carbonized, is supplied into the screw conveyer 10, with which screw conveyer 10 the organic waste is continuously supplied into the screw conveyer 1a of the dryer 1.

In the meantime, the high-temperature gas, which is transmitted from the re-incinerating furnace 3 through the transmitting passage 4, flows in the flow passage of high-temperature gas 1b of the dryer 1 and in the hollow shaft 16 of the screw conveyer 1a, and the inside of the screw conveyer 1a (the cylindrical body 11) of the dryer 1 is indirectly heated by the high-temperature gas both from the inside and the outside thereof. Here, "indirectly" means that the high temperature gas flowing in the flow passage of high-temperature gas 1b of the dryer 1 and the hollow shaft 16 of the screw conveyer 1a is completely isolated from the inside of the screw conveyer 1a, and that the high-temperature gas does not mix with the organic waste in the screw conveyer 1a and/or the evaporated gas generated in the process of water reduction of the organic waste.

Accordingly, the organic waste supplied into the screw conveyer 1a (the cylindrical body 11) of the dryer 1 is conveyed forward while being agitated by the screw conveyer 1a which is rotated by the drive motor 19 at a required speed and in a predetermined direction. At the same time, the organic waste is heated by the high-temperature gas flowing in the flow passage of high-temperature gas 1b and in the hollow shaft 16 of the screw conveyer 1a, whereby water contained in the organic waste is evaporated so that the amount of water contained in the organic waste is reduced and smelling gas is generated from the organic waste. The evaporated gas comprising steam evaporated from the organic waste and the other smelling gasses are absorbed by the fan 71 of the air-supply passage 7, and is transmitted compulsory to the re-incinerating furnace 3 via the air-supply passage 7 after the ultra-fine particles are removed by the dust collector 72.

At this time, as the inside of the screw conveyer 1a (the cylindrical body 11) is completely isolated from the flow passage of high-temperature gas 1b and an inside of the hollow shaft 16 of the screw conveyer 1a, the evaporated gas generated in the screw conveyer 1a (the cylindrical body 11) does not mix with the high-temperature gas flowing in the flow passage of high-temperature gas 1b and the inside of the hollow shaft 16 of the screw conveyer 1a.

In the meantime, after the organic waste, whose water therein is reduced in the dryer 1, is discharged from a lower surface of the ending part of conveying of the cylindrical body 11 of the dryer 1 into the supply passage 5, the organic waste is conveyed while being agitated by the screw conveyer 51 which is interposed in the supply passage 5, and is supplied to the upper peripheral surface of the hearth 22 of the furnace inside 2A through the input port 211b.

At this time, an inside of the screw conveyer 51 is filled with the organic waste, and there is no possibility that the outside air comes into the carbonization furnace 2 through the supply passage 5.

Further, while an high-temperature ambience of the furnace inside 2A of the carbonization furnace 2 is brought to be high by being heated with the burner 24, an amount of fuel, which is used for combustion by the burner 24 for heating the furnace inside 2A to be a required high-temperature ambience, can be cut down, since the amount of water in the organic waste supplied in the furnace inside 2A is reduced, and accordingly an amount of air supplied into the furnace inside 2A can also be cut down. Accordingly, it is possible to surely maintain a state of oxygen deficiency in the furnace inside 2A, and it does not happen that the organic waste is unexpectedly incinerated to ashes.

In the meantime, as mentioned above, the organic waste supplied on the hearth 22 is displaced in the spiral shape while being controlled by the controlling plates 271 and moving on the hearth 22 toward the center of the hearth 22 with the rotation of the hearth 22, and is carbonized on the hearth 22 during the process of the moving.

The carbide obtained by carbonizing the organic waste on the hearth 22 drops into the carbide exhaust opening part 221 of the hearth 22, is exhausted outside through the carbide exhaust pipe 223 and the carbide output pipe 232, and is utilized after being mixed with soil improvement materials, gardening materials, deodorants, humidity modifiers, sewage treatment materials, composts, fertilizers and so on.

Further, the organic waste generates carbon monoxide and the other combustible gasses in the process of carbonization. These gasses are continuously supplied to the re-incinerating furnace 3 which is connected to and communicated with the upper portion of the carbonization furnace 2.

The gas generated in the carbonization furnace 2 and supplied into the re-incinerating furnace 3 is incinerated by high-temperature flame of the burner 31 of the re-incinerating furnace 3 and decomposed, whereby the gas is deodorized and becomes nonpoisonous. At the same time, the evaporated gas transmitted from the dryer 1 to the re-incinerating furnace 3 through the air-supply passage 7 is also incinerated by the high-temperature flame of the burner 31 of the re-incinerating furnace 3 and decomposed, whereby the gas is deodorized and becomes nonpoisonous. Accordingly, the gas exhausted from the re-incinerating furnace 3 hardly smells and does not contain such poisonous compounds as dioxins.

The combustion gas obtained by burning the gas in the re-incinerating furnace 3 is supplied as high-temperature gas into the flow passage of high-temperature gas 1b of the dryer 1 and the hollow shaft 16 of the screw conveyer 1a through the transmitting passage 4 (branch passages 41 and 42). The organic waste in the screw conveyer 1a (cylindrical body 11) of the dryer 1 is heated with the high-temperature gas. Consequently, it is not necessary to prepare fuel for heating the dryer 1 separately and energy saving can be attained.

At this time, by regulating the degree of opening and closing of the damper 61 of the exhaust gas path 6 and the degree of absorption of the fan 91 of the regulation passage 9, the regulation gas, whose temperature is lower than that of the high-temperature gas exhausted from the re-incinerating furnace 3, flows into the transmitting passage 4 by a predetermined amount. The high-temperature gas exhausted from the re-incinerating furnace 3 is supplied to the dryer 1 after the temperature of the high-temperature gas is lowered to a required temperature and is regulated by mixing with the regulation gas.

Further, the control unit 411, which is interposed in the branch passage 41 of the transmitting passage 4, detects the temperature of the high-temperature gas flowing in the transmitting passage 4. The number of rotation of the drive motor 19 is controlled according to the temperature of the high-temperature gas so as to regulate the number of rotation of the screw blades 12 of the screw conveyer 1a of the dryer 1 and to regulate the detention time of the organic waste in the screw conveyer 1a of the dryer 1 in order to carry out the regulations for effective reduction of the water in the organic waste in the dryer 1.

After the high-temperature gas, flowing in the flow passage of high-temperature gas 1b of the dryer 1 and the hollow shaft 16 of the screw conveyer 1a, finishes heating the organic waste in the screw conveyer 1a of the dryer 1, part of the high-temperature gas is exhausted as exhaust gas through the other end of opening part of the exhaust gas path 6 via the exhaust gas path 6 and the exhaust passage 8, and the other part of the high-temperature gas is supplied to the transmitting passage 4 as the regulation gas via the regulation passage 9 to be reused.

At this time, the flow passage of high-temperature gas 1b and the inside of the hollow shaft 16 of the screw conveyer 1a are completely isolated to the inside of the screw conveyer 1a (the cylindrical body 11) of the dryer 1, and so the high-temperature gas, flowing in the flow passage of high-temperature gas 1b and the inside of the hollow shaft 16 of the screw conveyer 1a, is not mixed with the evaporated gas generated in the screw conveyer 1a (the cylindrical body 11), and the exhaust gas exhausted outside through the exhaust gas path 6 and the exhaust passage 8 hardly smells and is nonpoisonous.

We claim:

1. An apparatus for carbonization of organic waste comprising: a dryer for receiving organic waste and reducing an amount of water contained in the organic waste by heating with high-temperature gas, a carbonization furnace for carbonizing the organic waste in a high-temperature ambience, the amount of water of the organic waste being reduced by means of the dryer, a re-incinerating furnace for incinerating gas which is generated in the carbonization furnace, a transmitting passage for transmitting combustion gas, which is generated in the re-incinerating furnace, to the dryer as the high-temperature gas, and a supply passage for supplying the organic waste to the carbonization furnace; the said organic waste being treated to reduce the amount of water by means of the dryer; wherein the dryer comprises a screw conveyer for receiving the organic waste and a flow passage of high-temperature gas enclosing the screw conveyer; and wherein the transmitting passage is connected to and communicated with an inlet of the flow passage of high-temperature gas, and an exhaust passage is connected to and communicated with an outlet of the flow passage of high-temperature gas; and wherein the screw conveyer of the dryer and the re-incinerating furnace are connected to and communicated with each other by means of an air-supply passage to transmit evaporated gas, which is generated according to the reducing treatment of the amount of water in the organic waste.

2. An apparatus for carbonization of organic waste as claimed in claim 1, further comprising a dust collector interposed in the air-supply passage.

3. An apparatus for carbonization of organic waste comprising: a dryer for receiving organic waste and reducing an amount of water contained in the organic waste by heating with high-temperature gas, a carbonization furnace for carbonizing the organic waste in a high-temperature ambience, the amount of water of the organic waste being reduced by means of the dryer, a re-incinerating furnace for incinerating gas which is generated in the carbonization furnace, a transmitting passage for transmitting combustion gas, which is generated in the re-incinerating furnace, to the dryer as the high-temperature gas, and a supply passage for supplying the organic waste to the carbonization furnace; the said organic waste being treated to reduce the amount of water by means of the dryer; further comprising a flow passage provided with the dryer for the high-temperature gas generated in the re-incinerating furnace, wherein the dryer is heated with the high-temperature gas which flows in the flow passage of high-temperature gas and wherein the gas in the flow passage of high-temperature gas, which is used for heating, is exhausted; wherein the dryer comprises a screw conveyer for receiving the organic waste and a flow passage of high-temperature gas enclosing the screw conveyer; and wherein the transmitting passage is connected to and communicated with an inlet of the flow passage of high-temperature gas, and an exhaust passage is connected to and communicated with an outlet of the flow passage of high-temperature gas; and wherein the screw conveyer of the dryer and the re-incinerating furnace are connected to and communicated with each other by means of an air-supply passage to transmit evaporated gas, which is generated according to the reducing treatment of the amount of water in the organic waste.

4. An apparatus for carbonization of organic waste as claimed in claim 3, further comprising a dust collector interposed in the air-supply passage.

* * * * *

UNITED STATES PATENT AND TRADEMARK OFFICE
CERTIFICATE OF CORRECTION

PATENT NO. : 6,807,915 B2
DATED : October 26, 2004
INVENTOR(S) : Masahiro Sugano et al.

It is certified that error appears in the above-identified patent and that said Letters Patent is hereby corrected as shown below:

<u>Column 2,</u>
Lines 7, 15, 23 and 30, should read -- waste further comprising --

Signed and Sealed this

Twenty-first Day of December, 2004

JON W. DUDAS
*Director of the United States Patent and Trademark Office*